United States Patent
Li

(10) Patent No.: US 9,854,479 B2
(45) Date of Patent: Dec. 26, 2017

(54) COMMUNICATION METHOD IN INTER-RAT NETWORK, ACCESS NETWORK DEVICE AND UE

(71) Applicant: Huawei Technologies Co., Ltd., Shenzhen, Guangdong (CN)

(72) Inventor: Hui Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/163,449

(22) Filed: May 24, 2016

(65) Prior Publication Data

US 2016/0269944 A1  Sep. 15, 2016

Related U.S. Application Data

(63) Continuation of application No. PCT/CN2013/087769, filed on Nov. 25, 2013.

(51) Int. Cl.
*H04W 36/00* (2009.01)
*H04W 48/12* (2009.01)
(Continued)

(52) U.S. Cl.
CPC ... *H04W 36/0022* (2013.01); *H04W 36/0061* (2013.01); *H04W 48/06* (2013.01);
(Continued)

(58) Field of Classification Search
None
See application file for complete search history.

(56) References Cited

U.S. PATENT DOCUMENTS 7,787,880 B2 * 8/2010 Ueda ............... H04W 36/0061
370/328
2008/0273501 A1  11/2008 Constantine et al.
(Continued)

FOREIGN PATENT DOCUMENTS

CN     101505514 A     8/2009
CN     102196516 A     9/2011
(Continued)

OTHER PUBLICATIONS

"Subscriber Profile in GERAN", Nokia Siemens Networks & Nokia Corporation, 3GPP TSG GERAN #40, Nov. 17-21, 2008, 8 pages, TDoc GP-081673.
(Continued)

*Primary Examiner* — Shantell L Heiber

(57) ABSTRACT

A communication method in an inter-RAT network, an access network device, and UE are provided. The method includes: generating, by a source access network device, a temporary priority list, where the temporary priority list includes a frequency of a source network, a frequency of a target network, a priority of the frequency of the source network, and a priority of the frequency of the target network; sending, by the source access network device, the temporary priority list to a target access network device; and sending, by the source access network device, the temporary priority list to the UE. The present application can ensure that broadcast messages in networks of different RATs are consistent and prevent ping-pong reselection of the UE.

18 Claims, 6 Drawing Sheets

(51) Int. Cl.
*H04W 48/06* (2009.01)
*H04W 48/18* (2009.01)
*H04W 4/06* (2009.01)

(52) U.S. Cl.
CPC .......... *H04W 48/12* (2013.01); *H04W 48/18* (2013.01); *H04W 4/06* (2013.01)

(56) References Cited

U.S. PATENT DOCUMENTS

| | | | |
|---|---|---|---|
| 2010/0034160 A1* | 2/2010 | Prakash | H04W 68/02 370/329 |
| 2010/0113010 A1* | 5/2010 | Tenny | H04L 12/66 455/423 |
| 2011/0319085 A1 | 12/2011 | Ishii et al. | |
| 2012/0135739 A1 | 5/2012 | Paterson | |
| 2013/0065593 A1* | 3/2013 | Roberts | H04W 48/18 455/436 |
| 2013/0109394 A1 | 5/2013 | Rangaiah et al. | |
| 2013/0183981 A1 | 7/2013 | Singh et al. | |
| 2013/0303173 A1 | 11/2013 | Hole et al. | |
| 2014/0155065 A1* | 6/2014 | Centonza | H04W 36/0066 455/436 |
| 2014/0162648 A1* | 6/2014 | Cui | H04W 48/18 455/435.3 |
| 2014/0370894 A1* | 12/2014 | Hosdurg | H04W 36/0077 455/436 |
| 2016/0112915 A1 | 4/2016 | Jiang | |

FOREIGN PATENT DOCUMENTS

| | | |
|---|---|---|
| CN | 102264108 A | 11/2011 |
| CN | 102932877 A | 2/2013 |
| CN | 103024839 A | 4/2013 |
| CN | 103391590 A | 11/2013 |
| JP | 2003134549 A | 5/2003 |
| JP | 2008530945 A | 8/2008 |
| JP | 2013502083 A | 1/2013 |
| WO | 2010098264 A1 | 9/2010 |

OTHER PUBLICATIONS

"Idle mode Inter RAT load balancing", Huawei, 3GPP TSG RAN WG3 Meeting #59 bis, Mar. 31-Apr. 3, 2008, 5 pages, R3-080757.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 347 pages.

"3rd Generation Partnership Project; Technical Specification Group GSM/EDGE Radio Access Network; General Packet Radio Service (GPRS); Base Station System (BSS)-Serving GPRS Support Node (SGSN); BSS GPRS Protocol (BSSGP)(Release 12)", 3GPP TS 48.018 V12.0.0, Sep. 2013, 189 pages.

* cited by examiner

COMMUNICATION METHOD IN INTER-RAT NETWORK, ACCESS NETWORK DEVICE AND UE

CROSS-REFERENCE TO RELATED APPLICATIONS

This application is a continuation of International Application No. PCT/CN2013/087769, filed on Nov. 25, 2013, which is hereby incorporated by reference in its entirety.

TECHNICAL FIELD

The present application relates to the communications field, and in particular, to a communication method in an inter-RAT network, an access network device, and UE.

BACKGROUND

In a Global System for Mobile Communications (GSM) and Long Term Evolution (LTE) networking scenario, or an LTE and Universal Mobile Telecommunications System (UMTS) networking scenario, or a GSM, LTE, and UMTS networking scenario, when access network-side service load of a radio access technology (RAT) is relatively heavy, a load transfer algorithm is usually started to adjust a service policy, so as to transfer user equipment (UE) to a co-covered network of another RAT. A connected UE is load that can be currently measured and an idle UE is potential load, and the IDLE UE may initiate a service with a relatively large amount of data in the near future. The load transfer algorithm is classified into a connected algorithm and an IDLE algorithm according to a category of transferred UE. A transfer behavior of the IDLE UE is mainly controlled by a cell broadcast message.

A process of an IDLE load transfer in the prior art is specifically as follows: a network with heavier service load changes a system message that is broadcast by the network, adjusts a reselection priority of an IDLE cell with a frequency of the network to a lower level, and adjusts a reselection priority of a detected IDLE cell that is on a co-covered network of another RAT and has lighter load to a higher level, so that more UEs reselect the network of the another RAT.

A main problem that exists in the process of the IDLE load transfer in the prior art is that: reselection priorities of networks of different RATs cannot be coordinated. Generally, during initial configuration of networks, frequency reselection priorities of networks of various RATs are consistent. When an intra-RAT network unilaterally adjusts a priority, content of broadcast messages among the networks of various RATS is not coordinated and a load transfer effect is poor. For example, when load of an LTE is too heavy, the LTE broadcasts that a UMTS frequency has a high priority, and UE reselects the UMTS. After the UE reselects the UMTS, content of a system broadcast message of the UMTS network may be that the UMTS frequency has a low priority. In this case, it is greatly possible that the UE reselects the LTE again, which causes ping-pong reselection.

SUMMARY

Embodiments of the present application provide a communication method in an inter-RAT network, an access network device, and UE, which can ensure that broadcast messages among networks of different RATS are consistent and avoid ping-pong reselection of the UE.

A first aspect of the embodiments of the present application provides a communication method in an inter-RAT network, where the inter-RAT network includes a source network of a first RAT and a target network of a second RAT, the method applies to a process in which user equipment (UE) in the source network reselects the target network, and the method includes: generating, by a source access network device, a temporary priority list, where the temporary priority list includes a frequency of the source network, a frequency of the target network, a priority of the frequency of the source network, and a priority of the frequency of the target network, and the source access network device is a device that enables the UE to access the source network;

sending, by the source access network device, the temporary priority list to a target access network device, where the target access network device is a device that enables the UE to access the target network; and sending, by the source access network device, the temporary priority list to the UE.

With reference to the first aspect of the embodiments of the present application, in a first implementation manner of the first aspect of the embodiments of the present application, in the temporary priority list, the priority of the frequency of the source network is lower than the priority of the frequency of the target network.

With reference to the first aspect of the embodiments of the present application or the first implementation manner of the first aspect, in a second implementation manner of the first aspect of the embodiments of the present application, before the generating, by a source access network device, a temporary priority list, the method further includes:

detecting, by the source access network device, load of a serving cell, where the serving cell is a cell that is of the source network and on which the UE currently camps;

when the load of the serving cell is greater than a first load threshold, detecting, by the source access network device, load of the source network; and when the load of the source network is greater than a second load threshold, triggering the step of generating the temporary priority list.

With reference to the second implementation manner of the first aspect of the embodiments of the present application, in a third implementation manner of the first aspect of the embodiments of the present application, a method for the detecting, by the source access network device, load of the source network specifically includes:

deducing, by the source access network device, the load of the source network according to the detected load of the serving cell; or acquiring, by the source access network device, load of cells with all frequencies in the source network from a master control node, and adding the load of the cells with all the frequencies in the source network together.

With reference to the second implementation manner of the first aspect of the embodiments of the present application, in a fourth implementation manner of the first aspect of the embodiments of the present application, after it is detected that the load of the source network is greater than the second load threshold and before the triggering the step of generating the temporary priority list, the method further includes:

sending, by the source access network device, a load information acquisition request to another network of a different RAT; and receiving, by the source access network device, load information fed back by the another network of a different RAT, searching for, according to the load information, a network that is of a different RAT and whose load is less than a third load threshold, and using the network that is of a different RAT and whose load is less than the third load threshold as the target network.

With reference to the first aspect of the embodiments of the present application or the first implementation manner of the first aspect, in a fifth implementation manner of the first aspect of the embodiments of the present application, a method for the sending, by the source access network device, the temporary priority list to a target access network device specifically includes:

sending, by the source access network device, the temporary priority list to the target access network device by using a radio access network information management (RIM) procedure; or sending, by the source access network device, the temporary priority list to the master control node, so as to send the temporary priority list to the target access network device through the master control node.

With reference to the fifth implementation manner of the first aspect of the embodiments of the present application, in a sixth implementation manner of the first aspect of the embodiments of the present application, after the sending, by the source access network device, the temporary priority list to the UE, the method further includes:

continuing detecting, by the source access network device, load of the source network;

when the source access network device detects that the load of the source network is less than the second load threshold, sending, by the source access network device, first information to the target access network device by using the RIM procedure, where the first information is used to instruct the target access network device, like the source access network device, to send an original priority list to the UE; or when the source access network device detects that the load of the source network is less than the second load threshold, sending, by the source access network device, second information to the master control node, so as to send the second information to the target access network device through the master control node, where the second information is used to instruct the target access network device, like the source access network device, to send an original priority list to the UE.

A second aspect of the embodiments of the present application provides another communication method in an inter-RAT network, where the inter-RAT network includes a source network of a first RAT and a target network of a second RAT, the method applies to a process in which user equipment (UE) in the source network reselects the target network, and the method includes:

receiving, by a target access network device, a temporary priority list sent by a source access network device, where the temporary priority list includes a frequency of the source network, a frequency of the target network, a priority of the frequency of the source network, and a priority of the frequency of the target network, and the source access network device is a device that enables the UE to access the source network, and the target access network device is a device that enables the UE to access the target network; and sending, by the target access network device, the temporary priority list to the UE.

With reference to the second aspect of the embodiments of the present application, in a first implementation manner of the second aspect of the embodiments of the present application, in the temporary priority list, the priority of the frequency of the source network is lower than the priority of the frequency of the target network.

A third aspect of the embodiments of the present application provides another communication method in an inter-RAT network, where the inter-RAT network includes a source network of a first RAT and a target network of a second RAT, the method applies to a process in which user equipment (UE) in the source network reselects the target network, and the method includes:

receiving, by the UE, a temporary priority list sent by a source access network device, where the temporary priority list includes a frequency of the source network, a frequency of the target network, a priority of the frequency of the source network, and a priority of the frequency of the target network, and the source access network device is a device that enables the UE to access the source network;

performing, by the UE, network reselection according to the priorities of the frequencies in the temporary priority list; and when the UE reselects and accesses the target network, receiving the temporary priority list that the target access network device receives from the source access network device and sends to the UE, where the target access network device is a device that enables the UE to access the target network.

With reference to the third aspect of the embodiments of the present application, in a first implementation manner of the third aspect of the embodiments of the present application, in the temporary priority list, the priority of the frequency of the source network is lower than the priority of the frequency of the target network.

A fourth aspect of the embodiments of the present application provides an access network device, where the access network device is a device that enables user equipment (UE) to access a source network and the access network device includes:

a priority list generating unit, configured to generate a temporary priority list, where the temporary priority list includes a frequency of the source network, a frequency of a target network, a priority of the frequency of the source network, and a priority of the frequency of the target network; and a sending unit, configured to send the temporary priority list to a target access network device, where the target access network device is a device that enables the UE to access the target network, and send the temporary priority list to the UE.

With reference to the fourth aspect of the embodiments of the present application, in a first implementation manner of the fourth aspect of the embodiments of the present application, in the temporary priority list, the priority of the frequency of the source network is lower than the priority of the frequency of the target network.

With reference to the fourth aspect of the embodiments of the present application or the first implementation manner of the fourth aspect, in a second implementation manner of the fourth aspect of the embodiments of the present application, the access network device further includes:

a load detecting unit, configured to: detect load of a serving cell, where the serving cell is a cell that is of the source network and on which the UE currently camps; when the load of the serving cell is greater than a first load threshold, detect load of the source network; and when the load of the source network is greater than a second load threshold, trigger the priority list generating unit to generate the temporary priority list.

With reference to the second implementation manner of the fourth aspect of the embodiments of the present application, in a third implementation manner of the fourth aspect of the embodiments of the present application, a method for detecting the load of the source network by the load detecting unit specifically includes:

deducing, by the load detecting unit, the load of the source network according to the detected load of the serving cell; or acquiring, by the load detecting unit, load of cells with all frequencies in the source network from a master control node, and adding the load of the cells with all the frequencies in the source network together.

With reference to the second implementation manner of the fourth aspect of the embodiments of the present application, in a fourth implementation manner of the fourth aspect of the embodiments of the present application, after detecting that the load of the source network is greater than the second load threshold and before triggering the priority list generating unit to generate the temporary priority list, the load detecting unit is further configured to:

send a load information acquisition request to another network of a different RAT, receive load information fed back by the another network of a different RAT, search for a network that is of a different RAT and whose load is less than a third load threshold according to the load information, and use the network that is of a different RAT and whose load is less than the third load threshold as the target network.

With reference to the fourth aspect of the embodiments of the present application or the first implementation manner of the fourth aspect, in a fifth implementation manner of the fourth aspect of the embodiments of the present application, a method for sending the temporary priority list to the target access network device by the sending unit specifically includes:

sending, by the sending unit, the temporary priority list to the target access network device by using a radio access network information management (RIM) procedure; or sending, by the sending unit, the temporary priority list to the master control node, so as to send the temporary priority list to the target access network device through the master control node.

With reference to the fifth implementation manner of the fourth aspect of the embodiments of the present application, in a sixth implementation manner of the fourth aspect of the embodiments of the present application, the load detecting unit is further configured to:

continue detecting load of the source network after the sending unit sends the temporary priority list to the UE; and the sending unit is further configured to:

when the load detecting unit detects that the load of the source network is less than the second load threshold, send first information to the target access network device by using the RIM procedure, where the first information is used to instruct the target access network device, like the source access network device, to send an original priority list to the UE; or when the load detecting unit detects that the load of the source network is less than the second load threshold, send second information to the master control node, so as to send the second information to the target access network device through the master control node, where the second information is used to instruct the target access network device, like a source access network device, to send an original priority list to the UE.

A fifth aspect of the embodiments of the present application provides another access network device, where the access network device is a device that enables user equipment (UE) to access a target network and the access network device includes:

a receiving unit, configured to receive a temporary priority list sent by a source access network device, where the temporary priority list includes a frequency of a source network, a frequency of the target network, a priority of the frequency of the source network, and a priority of the frequency of the target network, and the source access network device is a device that enables the UE to access the source network; and a sending unit, configured to send the temporary priority list to the UE.

With reference to the fifth aspect of the embodiments of the present application, in a first implementation manner of the fifth aspect of the embodiments of the present application, in the temporary priority list, the priority of the frequency of the source network is lower than the priority of the frequency of the target network.

A sixth aspect of the embodiments of the present application provides a user equipment (UE), including:

a receiving unit, configured to receive a temporary priority list sent by a source access network device, where the temporary priority list includes a frequency of a source network, a frequency of a target network, a priority of the frequency of the source network, and a priority of the frequency of the target network, and the source access network device is a device that enables the UE to access the source network; and a network reselection unit, configured to perform network reselection according to the priorities of the frequencies in the temporary priority list;

where the receiving unit is further configured to:

when the network reselection unit reselects and accesses the target network, receive the temporary priority list that the target access network device receives from the source access network device and sends to the UE, where the target access network device is a device that enables the UE to access the target network.

With reference to the sixth aspect of the embodiments of the present application, in a first implementation manner of the sixth aspect of the embodiments of the present application, in the temporary priority list, the priority of the frequency of the source network is lower than the priority of the frequency of the target network.

A seventh aspect of the embodiments of the present application provides another access network device, where the access network device is a device that enables user equipment (UE) to access a source network and the access network device includes:

a processor, configured to generate a temporary priority list, where the temporary priority list includes a frequency of the source network, a frequency of a target network, a priority of the frequency of the source network, and a priority of the frequency of the target network; and a transmitter, configured to send the temporary priority list to a target access network device, where the target access network device is a device that enables the UE to access the target network, and send the temporary priority list to the UE.

With reference to the seventh aspect of the embodiments of the present application, in a first implementation manner of the seventh aspect of the embodiments of the present application, in the temporary priority list, the priority of the frequency of the source network is lower than the priority of the frequency of the target network.

With reference to the seventh aspect of the embodiments of the present application or the first implementation manner of the seventh aspect, in a second implementation manner of the seventh aspect of the embodiments of the present application, the processor is further configured to:

detect load of a serving cell, where the serving cell is a cell that is of the source network and on which the UE currently camps; when the load of the serving cell is greater than a first load threshold, detect load of the source network; and when the load of the source network is greater than a second load threshold, generate, by a generating unit, the temporary priority list.

With reference to the second implementation manner of the seventh aspect of the embodiments of the present application, in a third implementation manner of the seventh aspect of the embodiments of the present application, a method for detecting the load of the source network by the processor specifically includes:

deducing, by the processor, the load of the source network according to the detected load of the serving cell; or acquiring, by the processor, load of cells with all frequencies in the source network from a master control node, and adding the load of the cells with all the frequencies in the source network together.

With reference to the second implementation manner of the seventh aspect of the embodiments of the present application, in a fourth implementation manner of the seventh aspect of the embodiments of the present application, after detecting that the load of the source network is greater than the second load threshold and before generating the temporary priority list, the processor is further configured to:

send a load information acquisition request to another network of a different RAT, receive load information fed back by the another network of a different RAT, search for a network that is of a different RAT and whose load is less than a third load threshold according to the load information, and use the network that is of a different RAT and whose load is less than the third load threshold as the target network.

With reference to the seventh aspect of the embodiments of the present application or the first implementation manner of the seventh aspect, in a fifth implementation manner of the seventh aspect of the embodiments of the present application, a method for sending the temporary priority list to the target access network device by the transmitter specifically includes:

sending, by the transmitter, the temporary priority list to the target access network device by using a radio access network information management (RIM) procedure; or sending, by the transmitter, the temporary priority list to the master control node, so as to send the temporary priority list to the target access network device through the master control node.

With reference to the fifth implementation manner of the seventh aspect of the embodiments of the present application, in a sixth implementation manner of the seventh aspect of the embodiments of the present application, the processor is further configured to:

continue detecting load of the source network after the transmitter sends the temporary priority list to the UE; and the transmitter is further configured to:

when the processor detects that the load of the source network is less than the second load threshold, send first information to the target access network device by using the RIM procedure, where the first information is used to instruct the target access network device, like a source access network device, to send an original priority list to the UE; or when the processor detects that the load of the source network is less than the second load threshold, send second information to the master control node, so as to send the second information to the target access network device through the master control node, where the second information is used to instruct the target access network device, like a source access network device, to send an original priority list to the UE.

An eighth aspect of the embodiments of the present application provides another access network device, where the access network device is a device that enables user equipment (UE) to access a target network and the access network device includes:

a receiver, configured to receive a temporary priority list sent by a source access network device, where the temporary priority list includes a frequency of a source network, a frequency of the target network, a priority of the frequency of the source network, and a priority of the frequency of the target network, and the source access network device is a device that enables the UE to access the source network; and a transmitter, configured to send the temporary priority list to the UE.

With reference to the eighth aspect of the embodiments of the present application, in a first implementation manner of the eighth aspect of the embodiments of the present application, in the temporary priority list, the priority of the frequency of the source network is lower than the priority of the frequency of the target network.

A ninth aspect of the embodiments of the present application provides another user equipment (UE), including:

a receiver, configured to receive a temporary priority list sent by a source access network device, where the temporary priority list includes a frequency of a source network, a frequency of a target network, a priority of the frequency of the source network, and a priority of the frequency of the target network, and the source access network device is a device that enables the UE to access the source network; and a processor, configured to perform network reselection according to the priorities of the frequencies in the temporary priority list;

where the receiver is further configured to:

when the processor reselects and accesses the target network, receive the temporary priority list that the target access network device receives from the source access network device and sends to the UE, where the target access network device is a device that enables the UE to access the target network.

With reference to the ninth aspect of the embodiments of the present application, in a first implementation manner of the ninth aspect of the embodiments of the present application, in the temporary priority list, the priority of the frequency of the source network is lower than the priority of the frequency of the target network.

It can be learned from the foregoing technical solutions that, the embodiments of the present application have the following advantages:

In the embodiments of the present application, a source access network device generates a temporary priority list, where the source access network device is a device that enables UE to access a source network; the source access network device sends the temporary priority list to a target access network device, where the target access network device is a device that enables the UE to access a target network; the source access network device sends the temporary priority list to the UE. In the embodiments of the present application, the source access network device sends the generated temporary priority list to the target access network device, so that both the source access network device and the target access network device can send the temporary priority list to the UE, that is, it is ensured that broadcast messages in networks of different RATs are consistent. Regardless of which network the UE is located, the UE can always select a unique frequency of a highest priority from a priority list that is broadcast by the network, thereby reselecting a cell that corresponds to the frequency and preventing ping-pong reselection.

BRIEF DESCRIPTION OF THE DRAWINGS

To describe the technical solutions in the embodiments of the present application more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DETAILED DESCRIPTION

The following describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

The embodiments of the present application provide a communication method in an inter-RAT network, an access network device, and user equipment, which can ensure that broadcast messages in networks of different RATS are consistent and prevent ping-pong reselection of the UE.

Figure 1:
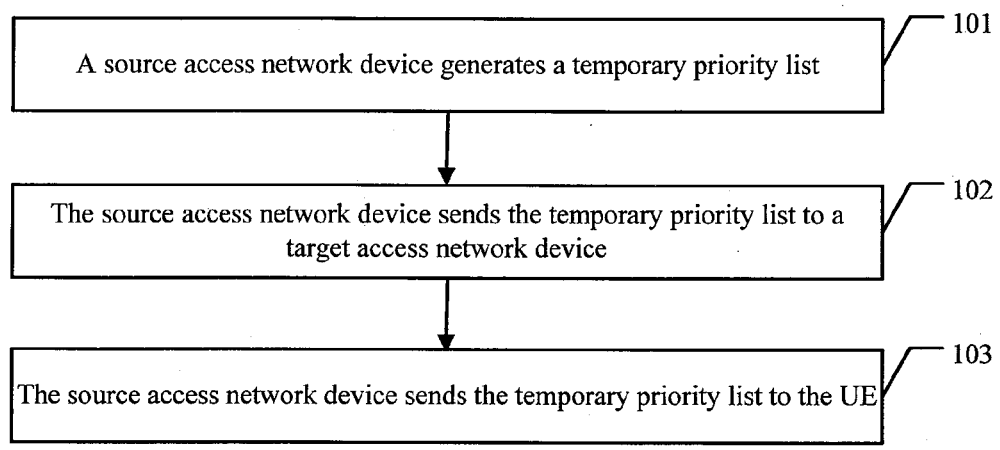
FIG. 1 is a schematic diagram of an embodiment of a communication method in an inter-RAT network according to the present application.

Referring to FIG. 1, FIG. 1 shows an embodiment of a communication method in an inter-RAT network in the present application. In this embodiment, the communication method in the inter-RAT network is described from a perspective of a source access network device. The method in this embodiment includes:

101. The source access network device generates a temporary priority list.

The inter-RAT network in this embodiment includes a source network of a first RAT and a target network of a second RAT, and the method in this embodiment applies to a process in which UE in the source network reselects the target network, where the source access network device is a device that enables the UE to access the source network.

The source access network device generates the temporary priority list, where the temporary priority list includes a frequency of the source network, a frequency of the target network, a priority of the frequency of the source network, and a priority of the frequency of the target network.

102. The source access network device sends the temporary priority list to a target access network device.

The target access network device is a device that enables the UE to access the target network. The source access network device sends the generated temporary priority list to the target access network device.

103. The source access network device sends the temporary priority list to the UE.

After sending the temporary priority list to the target access network device, the source access network device sends the temporary priority list to the UE, so that the UE performs network reselection according to the temporary priority list. A specific manner of sending the temporary priority list to the UE may be broadcasting.

After the UE reselects the target network, the target access network device sends, to the UE, the temporary priority list that is received from the source access network device. Therefore, regardless of whether the UE is located in the source network or the target network, the UE receives a same network broadcast message.

The source access network device and the target access network device in this embodiment include but are not limited to: a NodeB, an evolved NodeB (eNB), a home base station (Home NodeB, HNB)/(Home eNodeB, HeNB), a radio network controller (RNC), a base station controller (BSC), and a base transceiver station (BTS). In addition, the source access network device and the target access network device may be devices of a same type, for example, different baseband boards in a same base station, different processors on a same baseband board or the like, and may also be different devices.

In this embodiment, a source access network device sends a generated temporary priority list to a target access network device, so that both the source access network device and the target access network device can send the temporary priority list to UE, which ensures that broadcast messages in networks of different RATs are consistent. Therefore, regardless of which network the UE is located in, the UE can always select a unique frequency with a highest priority from a priority list that is broadcast by the network, thereby reselecting a cell that corresponds to the frequency and preventing ping-pong reselection.

Figure 2:
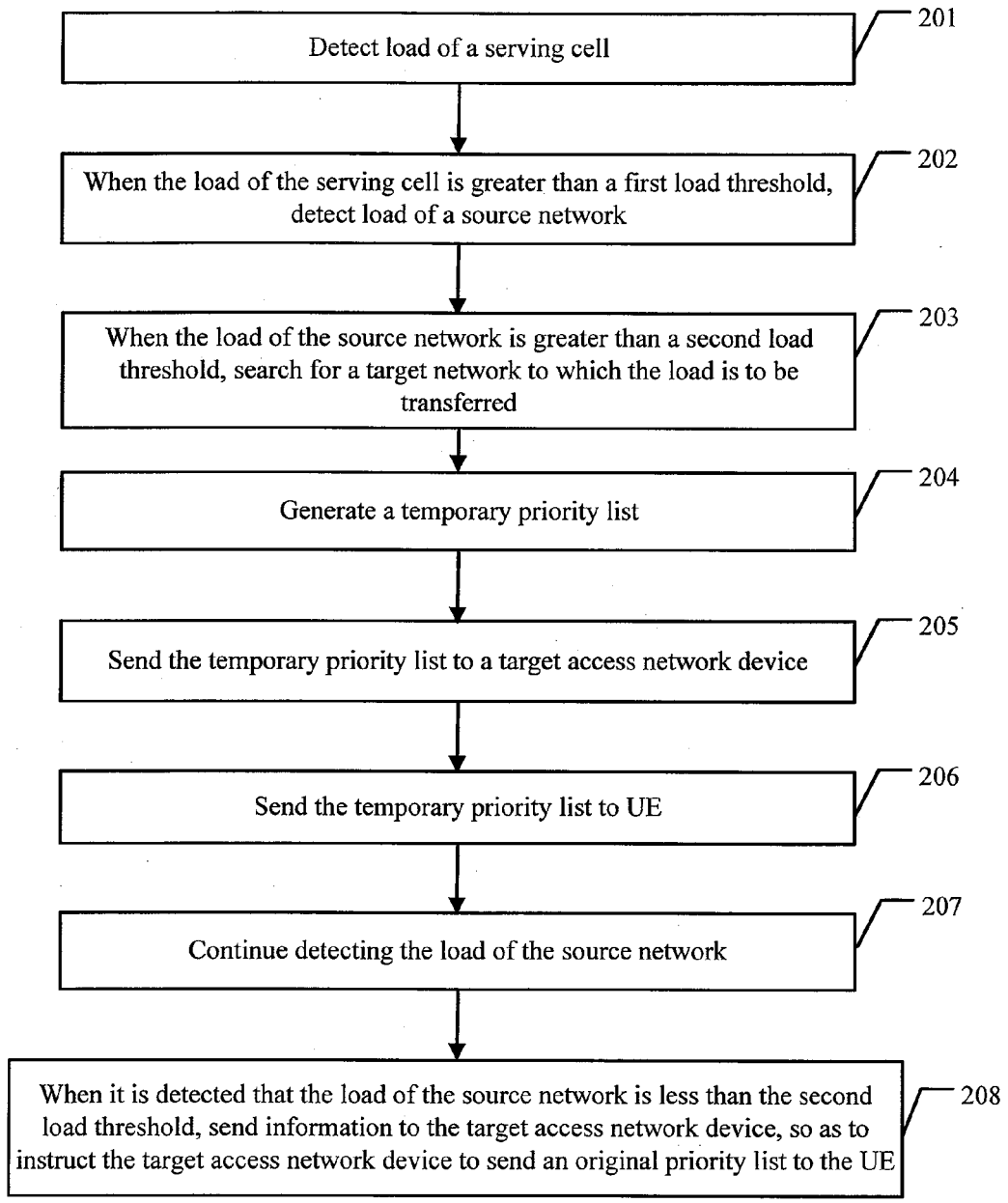
FIG. 2 is a schematic diagram of another embodiment of a communication method in an inter-RAT network according to the present application.

For ease of understanding, the following describes a communication method in an inter-RAT network in an embodiment of the present application by using a specific example. Referring to FIG. 2, another embodiment of the communication method in the inter-RAT network in the present application includes:

201. A source access network device detects load of a serving cell.

In a networking scenario of the inter-RAT network, after UE is powered on, the UE registers with a network; after the registration is successful, the UE camps on a cell that is covered by the network. Here, the network in which the UE is currently located is referred to as a source network; the cell on which the UE camps in the source network is referred to as a serving cell. After the UE camps on the serving cell, the source access network device detects load of the serving cell by detecting resource usage of the serving cell or the number of users who access the serving cell. The source access network device is a device that enables the UE to access the source network.

202. When it is detected that the load of the serving cell is greater than a first load threshold, the source access network device detects load of a source network.

The source access network device may set a load threshold, that is, the first load threshold, for the serving cell in advance according to a load capacity of the serving cell. When it is detected that the load of the serving cell is greater than the first load threshold, the source access network device continues to detect the load of the source network.

When the load of the serving cell is too heavy, the source access network device needs to further detect load of another cell in the source network. If the load of the another cell in the source network is not heavy, the UE may be transferred to the another cell in the source network; if the load of all the other cells in the source network is too heavy, the source access network device needs to search for a target network to which the load may be to be transferred.

That is, when the load of the serving cell is too heavy, whether it is need to search for the target network depends on the load of the source network.

If the source network is in intra-frequency networking and a load balancing policy is enabled inside the source network, that is, load of cells in the source network is approximately the same at a same moment, the load of the source network may be deduced by the source access network device according to the load that is of the serving cell and detected by the source access network device. If the source network is in inter-frequency networking, the load of the source network needs to be jointly determined according to load of cells with various frequencies in the source network. In this case, the source access network device may acquire the load of the cells with the various frequencies in the source network from a master control node, and then add the load of the cells with the various frequencies in the source network together to acquire the load of the source network.

203. When it is detected that the load of the source network is greater than a second load threshold, the source access network device searches for a target network to which the load is to be transferred.

The source access network device may set the second load threshold for the source network in advance according to a network capacity of the source network. When the source access network device detects that the load of the source network is greater than the second load threshold, it indicates that all cells in the source network have reached a load limit and cannot provide a service for more UEs.

When the load of the source network is greater than the second load threshold, it indicates that the serving cell of the UE has reached the load limit and there is no cell to which the load may be to be transferred in the source network. The source access network device needs to search for the target network to which the load is to be transferred. A specific process of searching for the target network is as follows:

The source access network device sends a load information acquisition request to another network of a different RAT, receives load information fed back by the another network of a different RAT, and determines whether there is a network that is of a different RAT and whose load is less than a third load threshold in other networks of different RATs, where the third load threshold may be set by the source access network device in advance according to load capacity of the another network of a different RAT or may be set by the another network of a different RAT in advance.

If there is a network that is of a different RAT and whose load is less than the third load threshold in the other networks of different RATs, the source access network device uses the network that is of an different RAT and whose load is less than the third load threshold as the target network to which the load is to be transferred.

204. The source access network device generates a temporary priority list.

The source access network device adjusts a priority and a location of each frequency of the source network and the target network in an original priority list to generate the temporary priority list. In the temporary priority list, a priority of a frequency of the source network is lower than a priority of a frequency of the target network. Specific methods for generating the temporary priority list may be as follows:

Manner 1:

The priority and the location of each frequency of the source network and the target network in the original priority list are reallocated to generate the temporary priority list.

It is assumed that the source network is an LTE and the source network has only one frequency L1; the target network is a UMTS and the target network has two frequencies U2 and U3. Priorities of the frequencies L1, U2, and U3 in the original priority list are respectively:

L1 (Priority 7), U2 (Priority 3), and U3 (Priority 5).

Locations of the three frequencies that are recorded in the original priority list are respectively:

L1 (P1), U3 (P2), and U2 (P3).

The priority of the frequency of the source network is adjusted to a lower level, the priorities of the frequencies of the target network are adjusted to higher levels, and an original relatively high/low relationship between the priorities of the multiple frequencies of the target network needs to be retained. The priorities of the frequencies in the temporary priority list after the adjustment are respectively:

L1 (Priority 3), U2 (Priority 5), and U3 (Priority 7).

The locations of the three frequencies are accordingly adjusted, and the locations of the three frequencies in the temporary priority list generated after the adjustment are respectively:

L1 (P3), U2 (P2), and U3 (P1).

In this case, the frequency U3 has a highest priority, and the UE may be transferred to a cell corresponding to the frequency U3.

Manner 2:

Some frequencies with heavier load in the source network are directly ignored, and the temporary priority list is generated.

It is assumed that the source network is still an LTE, the source network has two frequencies L1 and L2, and a frequency of the serving cell on which the UE currently camps is the L1; the target network is a UMTS and the target network has one frequency U3. Priorities of the frequencies L1, L2, and U3 in the original priority list are respectively:

L1 (Priority 7), L2 (Priority 6), and U3 (Priority 2).

Locations of the three frequencies that are recorded in the original priority list are respectively:

L1 (P1), L2 (P2), and U3 (P3).

The source access network device directly ignores the frequency L2 of a lower priority in the source network, and adjusts the priorities and locations of the remaining frequencies. The priorities and locations of the frequencies in the temporary priority list generated after the adjustment are respectively:

L1 (Priority 2), U3 (Priority 7); and L1 (P3), U3 (P1). The UE automatically considers, by default, that the frequency L2 that is not carried in the temporary priority list has a lowest priority.

The foregoing manner 2 applies only to a situation in which there are multiple frequencies in the source network, that is, a situation of inter-frequency networking. The foregoing manner 1 raises no requirement for the number of frequencies of the source network and the target network, and applies to any situation.

205. The source access network device sends the temporary priority list to a target access network device.

The source access network device sends the generated temporary priority list to the target access network device and specific methods of sending the temporary priority list may be as follows:

Manner 1:

The temporary priority list is sent to the target access network device by using a radio access network information management (RIM) procedure.

Specifically, the source access network device may place the temporary priority list in a system information block (SIB) that is of RIM information and is related to inter-system reselection. The original priority list is replaced by the temporary priority list, for example, the temporary priority list is placed in a SIB 6 structure of a neighboring cell of a UMTS terrestrial radio access network and sent to the target network.

The source access network device and the target access network device may agree in advance that, once the target access network device receives a new priority list (that is, the temporary priority list), the target access network device sends the new priority list to the UE; or when the source access network device sends the temporary priority list to the target access network device, the source access network device adds an information element field, which indicates that after receiving the temporary priority list, the target access network device needs to send the temporary priority list to the UE.

In addition, when sending the temporary priority list to the target access network device, the source access network device may further add another information element field, which identifies valid duration of the temporary priority list. Once broadcast time of the temporary priority list exceeds the identified valid duration, both the source access network device and the target access network device send the original priority list to the UE.

Manner 2:

The temporary priority list is sent to a master control node, so as to send the temporary priority list to the target access network device through the master control node.

Specifically, the source access network device sends a load adjustment request to the master control node; after marking the valid duration for the temporary priority list, the source access network device sends the temporary priority list to the master control node, so that the master control node sends the temporary priority list and the valid duration to the target access network device. The master control node may be an operation supporting system (OSS) network element or another node that has a master control function.

The source access network device may send the temporary priority list to the target access network device by using either one of the foregoing two manners, so that when the load of the source network is greater than the second load threshold, both the source access network device and the target access network device send the temporary priority list to the UE.

206. The source access network device sends the temporary priority list to UE.

After sending the generated temporary priority list to the target access network device, the source access network device sends the temporary priority list to the UE, and a specific manner of sending the temporary priority list to the UE may be broadcasting.

207. The source access network device continues detecting the load of the source network.

After the source access network device sends the temporary priority list to the UE, the source access network device continues detecting the load of the source network.

208. When it is detected that the load of the source network is less than the second load threshold, send information to the target access network device, so as to instruct the target access network device, like the source access network device, to send an original priority list to the UE.

The source access network device detects whether the load of the source network recovers to a normal level, that is, the load of the source network is less than the second load threshold.

When the source access network device detects that the load of the source network is less than the second load threshold, the source access network device sends information to the target access network device, so as to instruct the target access network device, like the source access network device, to send the original priority list to the UE.

Specifically, the source access network device may send first information to the target access network device by using the RIM procedure, that is, send a RIM message that does not carry an inter-system reselection SIB to the target access network device, where the message is used to instruct the target access network device, like the source access network device, to send the original priority list to the UE.

Alternatively, the source access network device sends second information to the master control node, so as to send the second information to the target access network device through the master control node, where the second information is used to instruct the target access network device, like the source access network device, to send the original priority list to the UE.

In this embodiment, a source access network device detects load of a serving cell, detects load of a source network when the load of the serving cell is greater than a first load threshold, generates a temporary priority list when the load of the source network is greater than a second load threshold, and sends the temporary priority list to a target access network device, so that both the source access network device and the target access network device can send the temporary priority list to user equipment (UE). In this embodiment, when the load of the serving cell is too heavy and there is no other cell to which the load may be to be transferred in the source network, the source access network device sends the generated temporary priority list to the target access network device, so that the priority lists sent by the source access network device and the target access network device to the UE are both the temporary priority list. In addition, when the load of the source network recovers to a normal level, the source access network device sends information to instruct the target access network device, like the source access network device, to send an original priority list to the UE. This ensures that priority lists acquired by the UE from networks of different RATs are the same, and prevents ping-pong reselection of the UE.

Figure 3:
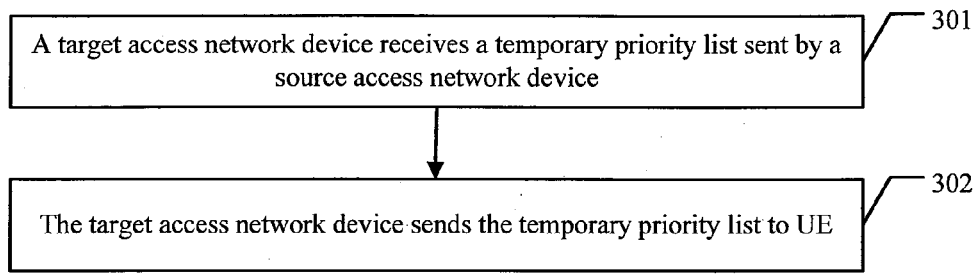
FIG. 3 is a schematic diagram of another embodiment of a communication method in an inter-RAT network according to the present application.

In the foregoing two embodiments, the communication method in the inter-RAT network in the present application is described from a perspective of the source access network device. The following embodiment describes a communication method in an inter-RAT network in the present application from a perspective of a target access network device. Referring to FIG. 3, the method in this embodiment includes:

301. The target access network device receives a temporary priority list sent by a source access network device.

The target access network device receives the temporary priority list that is sent by the source access network device by using a RIM procedure or through a master control node, where the temporary priority list includes a frequency of a source network, a frequency of a target network, a priority of the frequency of the source network, and a priority of the frequency of the target network. In the temporary priority list, the priority of the frequency of the source network is lower than the priority of the frequency of the target network.

The source access network device is a device that enables UE to access the source network, and the target access network device is a device that enables the UE to access the target network.

302. The target access network device sends the temporary priority list to UE.

The target access network device may send the temporary priority list to the UE by means of broadcasting.

In addition, when the target access network device receives information that is sent by the source access network device and is used to instruct the target access network device to send an original priority list to the UE, the target access network device sends the original priority list to the UE.

In this embodiment, after receiving a temporary priority list sent by a source access network device, a target access network device, like the source access network device, sends the temporary priority list to UE. When receiving information that is sent by the source access network device and is used to instruct the target access network device to send an original priority list to the UE, the target access network device, like the source access network device, sends the original priority list to the UE, which ensures that broadcast messages of networks of different RATS are consistent; therefore, regardless of which network the UE is located in, priority lists acquired are the same, which prevents ping-pong reselection of the UE.

Figure 4:
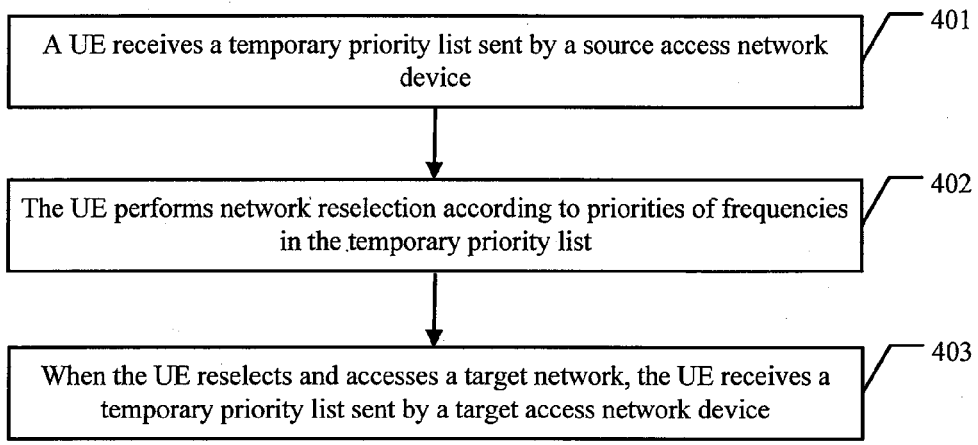
FIG. 4 is a schematic diagram of another embodiment of a communication method in an inter-RAT network according to the present application.

The following describes a communication method in an inter-RAT network in the present application from a perspective of user equipment (UE). Referring to FIG. 4, the method in this embodiment includes:

401. The UE receives a temporary priority list sent by a source access network device.

The inter-RAT network in this embodiment includes a source network of a first RAT and a target network of a second RAT, and the source access network device is a device that enables the UE to access the source network.

The temporary priority list received by the UE includes a frequency of the source network, a frequency of the target network, a priority of the frequency of the source network, and a priority of the frequency of the target network; in the temporary priority list, the priority of the frequency of the source network is lower than the priority of the frequency of the target network.

402. The UE performs network reselection according to priorities of frequencies in the temporary priority list.

The UE finds a frequency of a highest priority from the temporary priority list, and reselects a network corresponding to the frequency of the highest priority, that is, the target network.

403. When the UE reselects and accesses a target network, the UE receives a temporary priority list sent by a target access network device.

The UE receives, in the target network, the temporary priority list sent by the target access network device, and the temporary priority list that is sent by the target access network device to the UE is the same as the temporary priority list that is sent by the source access network device to the UE.

In this embodiment, when UE is located in a source network, the UE receives a temporary priority list sent by a source access network device; when the UE is located in a target network, the UE receives a temporary priority list sent by a target access network device. In other words, in the inter-RAT network, regardless of which network the UE is located in, priority lists received are the same; therefore, ping-pong reselection may be effectively prevented.

Figure 5:
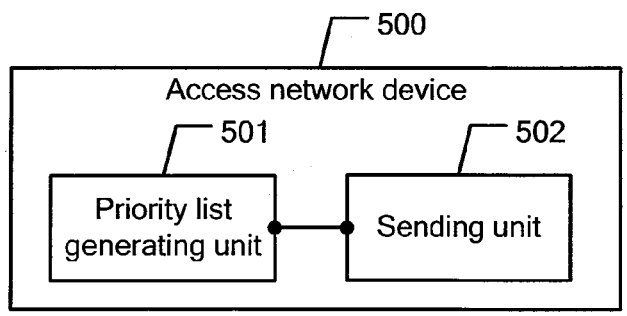
FIG. 5 is a schematic diagram of an embodiment of an access network device according to the present application.

The following describes an access network device in an embodiment of the present application. Referring to FIG. 5, in this embodiment, a device that enables UE to access a source network, that is, a source access network device is described. An access network device 500 in this embodiment includes:

a priority list generating unit 501, configured to generate a temporary priority list, where the temporary priority list includes a frequency of the source network, a frequency of a target network, a priority of the frequency of the source network, and a priority of the frequency of the target network; and a sending unit 502, configured to send the temporary priority list to a target access network device, where the target access network device is a device that enables the UE to access the target network, and send the temporary priority list to the UE.

In this embodiment, a priority list generating unit of a source access network device sends a generated temporary priority list to a target access network device, so that both a sending unit of the source access network device and the target access network device can send the temporary priority list to UE, that is, it is ensured that broadcast messages in networks of different RATs are consistent. Therefore, regardless of which network the UE is located in, the UE can always select a unique frequency of a highest priority from a priority list that is broadcast by the network, thereby reselecting a cell that corresponds to the frequency and preventing ping-pong reselection.

Figure 6:
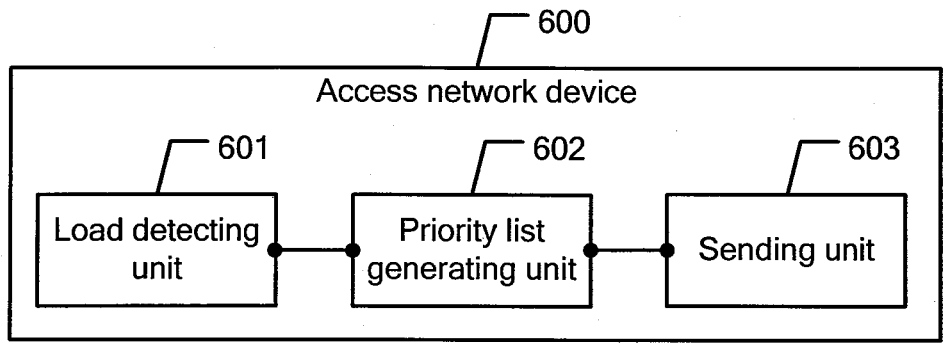
FIG. 6 is a schematic diagram of another embodiment of an access network device according to the present application.

For ease of understanding, the following describes an access network device in an embodiment of the present application by using a specific embodiment. Referring to FIG. 6, an access network device 600 described in this embodiment is still a source access network device. The access network device 600 includes:

a load detecting unit 601, configured to: detect load of a serving cell, where the serving cell is a cell that is of a source network and on which UE currently camps; when the load of the serving cell is greater than a first load threshold, detect load of the source network; when the load of the source network is greater than a second load threshold, send a load information acquisition request to another network of a different RAT; receive load information fed back by the another network of a different RAT; search for, according to the load information, a network that is of a different RAT and whose load is less than a third load threshold; use the network that is of a different RAT and whose load is less than the third load threshold as a target network; and trigger a priority list generating unit 602 to generate a temporary priority list;

the priority list generating unit 602, configured to generate the temporary priority list, where the temporary priority list includes a frequency of the source network, a frequency of the target network, a priority of the frequency of the source network, and a priority of the frequency of the target network; and a sending unit 603, configured to send the temporary priority list to a target access network device, where the target access network device is a device that enables the UE to access the target network, and send the temporary priority list to the UE.

For ease of understanding, the following describes an interaction manner among units of the access network device 600 in this embodiment by using an application scenario.

In a networking scenario of the inter-RAT network, after the UE is powered on, the UE registers with a network; after the registration is successful, the UE camps on a cell that is covered by the network. Here, the network in which the UE is currently located is referred to as the source network; the cell on which the UE camps in the source network is referred to as the serving cell. After the UE camps on the serving cell, the load detecting unit 601 of the source access network device detects the load of the serving cell by detecting resource usage of the serving cell or the number of users who access the serving cell.

The load detecting unit 601 may set a load threshold, that is, the first load threshold, for the serving cell in advance according to a load capacity of the serving cell. When it is detected that the load of the serving cell is greater than the first load threshold, the load detecting unit 601 continues to detect the load of the source network.

When the load of the serving cell is too heavy, the load detecting unit 601 needs to further detect load of another cell in the source network. If the load of the another cell in the source network is not heavy, the UE may be transferred to the another cell in the source network; if the load of all the other cells in the source network is too heavy, the load detecting unit 601 needs to search for the target network to which the load may be to be transferred.

That is, when the load of the serving cell is too heavy, whether it is need to search for the target network depends on the load of the source network.

If the source network is in intra-frequency networking and a load balancing policy is enabled inside the source network, that is, load of cells in the source network is approximately the same at a same moment, the load detecting unit 601 may deduce the load of the source network according to the detected load of the serving cell. If the source network is in inter-frequency networking, the load detecting unit 601 may acquire load of cells with various frequencies in the source network from a master control node, and then add load of the cells with the various frequencies in the source network together to acquire the load of the source network.

The load detecting unit 601 may set the second load threshold for the source network in advance according to a network capacity of the source network. When it is detected that the load of the source network is greater than the second load threshold, it indicates that all cells in the source network have reached a load limit and cannot provide a service for more UEs.

When the load of the source network is greater than the second load threshold, it indicates that there is no cell to which the load may be to be transferred in the source network. In this case, the load detecting unit 601 needs to search for the target network to which the load is to be transferred.

Specifically, the load detecting unit 601 sends a load information acquisition request to another network of a different RAT, receives load information fed back by the another network of a different RAT, and determines whether there is a network that is of a different RAT and whose load is less than a third load threshold in other networks of different RATs, where the third load threshold may be set by the load detecting unit 601 in advance according to load capacity of the another network of a different RAT or may be set by the another network of a different RAT in advance.

If there is a network that is of a different RAT and whose load is less than the third load threshold in the other networks of different RATs, the load detecting unit 601 uses the network of a different RAT as the target network to which the load is to be transferred.

After the load detecting unit 601 acquires the target network, the priority list generating unit needs to adjust a priority and a location of each frequency of the source network and the target network in an original priority list to generate the temporary priority list. In the temporary priority list, a priority of a frequency of the source network is lower than a priority of a frequency of the target network. Specific methods for generating the temporary priority list by the priority list generating unit 602 may be as follows:

Manner 1:

The priority and the location of each frequency of the source network and the target network in the original priority list are reallocated to generate the temporary priority list.

It is assumed that the source network is an LTE and the source network has only one frequency L1; the target network is a UMTS and the target network has two frequencies U2 and U3. Priorities of the frequencies L1, U2, and U3 in the original priority list are respectively:

L1 (Priority 7), U2 (Priority 3), and U3 (Priority 5).

Locations of the three frequencies that are recorded in the original priority list are respectively:

L1 (P1), U3 (P2), and U2 (P3).

The priority list generating unit 602 adjusts the priority of the frequency of the source network to a lower level and adjusts the priorities of the frequencies of the target network to higher levels. An original relatively high/low relationship between the priorities of the multiple frequencies of the target network needs to be retained. The priorities of the frequencies in the temporary priority list after the adjustment are respectively:

L1 (Priority 3), U2 (Priority 5), and U3 (Priority 7).

The locations of the three frequencies are accordingly adjusted, and the locations of the three frequencies in the temporary priority list generated after the adjustment are respectively:

L1 (P3), U2 (P2), and U3 (P1).

Manner 2:

Some frequencies with heavier load in the source network are directly ignored, and the temporary priority list is generated.

It is assumed that the source network is still an LTE, the source network has two frequencies L1 and L2, and a frequency of the serving cell on which the UE currently camps is the L1; the target network is a UMTS and the target network has one frequency U3. Priorities of the frequencies L1, L2, and U3 in the original priority list are respectively:

L1 (Priority 7), L2 (Priority 6), and U3 (Priority 2).

Locations of the three frequencies that are recorded in the original priority list are respectively:

L1 (P1), L2 (P2), and U3 (P3).

The priority list generating unit 602 directly ignores the frequency L2 of a lower priority in the source network, and adjusts the priorities and locations of the remaining frequencies. The priorities and locations of the frequencies in the temporary priority list generated after the adjustment are respectively:

L1 (Priority 2), U3 (Priority 7); and L1 (P3), U3 (P1). The UE automatically considers, by default, that the frequency L2 that is not carried in the temporary priority list has a lowest priority.

The foregoing manner 2 applies only to a situation in which there are multiple frequencies in the source network. The foregoing manner 1 raises no requirement for the number of frequencies of the source network and the target network, and applies to any situation.

After the temporary priority list is generated, the sending unit 603 sends the temporary priority list to the target access network device, so that both the source access network device and the target access network device send the temporary priority list to the UE. Specific manners of sending the temporary priority list to the target access network device by the sending unit 603 are as follows:

Manner 1:

The temporary priority list is sent to the target access network device by using a radio access network information management (RIM) procedure.

Specifically, the sending unit 603 may place the temporary priority list in a system information block (SIB) that is of RIM information and is related to inter-system reselection. The original priority list is replaced by the temporary priority list, for example, the temporary priority list is placed in a SIB 6 structure of a neighboring cell of a UMTS terrestrial radio access network and sent to the target access network device.

The source access network device and the target access network device may agree in advance that, once the target access network device receives a new priority list (that is, the temporary priority list), the target access network device sends the new priority list to the UE; or when the sending unit 603 sends the temporary priority list to the target access network device, the sending unit 603 adds an information element field, which indicates that after receiving the temporary priority list, the target access network device needs to send the temporary priority list to the UE.

In addition, when sending the temporary priority list to the target access network device, the sending unit 603 may further add another information element field, which identifies valid duration of the temporary priority list. Once broadcast time of the temporary priority list exceeds the identified valid duration, both the source access network device and the target access network device send the original priority list to the UE.

Manner 2:

The temporary priority list is sent to a master control node, so as to send the temporary priority list to the target access network device through the master control node.

Specifically, the sending unit 603 sends a load adjustment request to the master control node; after marking the valid duration for the temporary priority list, the sending unit 603 sends the temporary priority list to the master control node, so that the master control node sends the temporary priority list and the valid duration to the target access network device. The master control node may be an OSS network element or another node that has a master control function.

The sending unit 603 may send the temporary priority list to the target access network device by using either one of the foregoing two manners, so that when the load of the source network is greater than the first load threshold, both the source access network device and the target access network device send the temporary priority list to the UE. A specific manner of sending the temporary priority list to the UE by the sending unit 603 may be broadcasting.

After the sending unit 603 sends the temporary priority list to the UE, the load detecting unit 601 continues detecting the load of the source network. When it is detected that the source network recovers to a normal level, that is, the load of the source network is less than the second load threshold, the sending unit 603 sends information to the target access network device, so as to instruct the target access network device, like the source access network device, to send the original priority list to the UE.

Correspondingly, the sending unit 603 may send first information to the target access network device by using the RIM procedure, that is, send a RIM message that does not carry an inter-system reselection SIB to the target access network device, where the message is used to instruct the target access network device, like the source access network device, to send the original priority list to the UE.

Alternatively, the sending unit 603 sends second information to the master control node, so as to send the second information to the target access network device through the master control node, where the second information is used to instruct the target access network device, like the source access network device, to send the original priority list to the UE.

In this embodiment, a load detecting unit detects load of a serving cell and detects load of a source network when the load of the serving cell is greater than a first load threshold; when the load of the source network is greater than a second load threshold, a priority list generating unit generates a temporary priority list; a sending unit sends the temporary priority list to a target access network device, so that both a source access network device and the target access network device send the temporary priority list to UE. In this embodiment, when the load of the serving cell is too heavy and there is no cell with light load to which the load may be to be transferred in the source network, the sending unit sends the temporary priority list generated by the priority list generating unit to the target access network device, so that the priority lists sent by the source access network device and the target access network device to the UE are both the temporary priority list. In addition, when the load of the source network recovers to a normal level, the sending unit sends information to instruct the target access network device, like the source access network device, to send an original priority list to the UE. This ensures that priority lists acquired by the UE from networks of different RATS are the same, and prevents ping-pong reselection.

It should be noted that the sending unit in this embodiment may be a transmitter (for example, a base station) of an access network device, or may be a transceiver of the access network device. The priority list generating unit may be an independently set processor or may be integrated into a processor of the access network device for implementation. Besides, the priority list generating unit may be stored in a memory of the access network device in a form of program code. A function of the priority list generating unit is invoked and executed by a processor of the access network device. Implementation of the load detecting unit is the same as that of the priority list generating unit, and the load detecting unit may be integrated with the priority list generating unit or may be independently implemented. The processor herein may be a central processing unit (CPU), or an application-specific integrated circuit (ASIC), or be configured as one or more integrated circuits that implement the embodiments of the present application.

Figure 7:
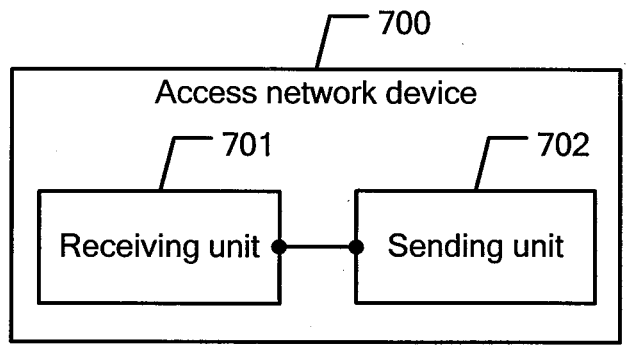
FIG. 7 is a schematic diagram of another embodiment of an access network device according to the present application.

The foregoing two embodiments describe, the source access network device, and the following embodiment describes a device that enables UE to access a target network, that is, a target access network device. Referring to FIG. 7, an access network device 700 in this embodiment includes:

a receiving unit 701, configured to receive a temporary priority list sent by a source access network device, where the temporary priority list includes a frequency of a source network, a frequency of the target network, a priority of the frequency of the source network, and a priority of the frequency of the target network, and the source access network device is a device that enables the UE to access the source network; and a sending unit 702, configured to send the temporary priority list to the UE.

In this embodiment, the receiving unit 701 may receive the temporary priority list that is sent by the source access network device by using a RIM procedure or through a master control node. In the temporary priority list, the priority of the frequency of the source network is lower than the priority of the frequency of the target network.

The sending unit 702 may send, by means of broadcasting, the temporary priority list received by the receiving unit 701 to the UE.

In addition, when the receiving unit 701 receives information that is sent by the source access network device and is used to instruct the target access network device to send an original priority list to the UE, the sending unit 702 sends the original priority list to the UE.

In this embodiment, after a receiving unit receives a temporary priority list sent by a source access network device, a sending unit, like the source access network device, sends the temporary priority list to UE. When the receiving unit receives information that is sent by the source access network device and is used to instruct a target access network device to send an original priority list to the UE, the sending unit, like the source access network device, sends the original priority list to the UE, which ensures that broadcast messages in networks of different RATS are consistent; therefore, regardless of which network the UE is located in, priority lists acquired are the same, which prevents ping-pong reselection of the UE.

It should be noted that the receiving unit in this embodiment may be a receiver of an access network device, and the sending unit may be a transmitter of the access network device. Besides, the receiving unit and the sending unit may be integrated to form a transceiver of the access network device. The receiving unit and the sending unit may be connected to a processor of the access network device, so as to send received data to the processor for processing or send data that is processed by the processor. The processor herein may be a central processing unit (CPU), or an application-specific integrated circuit (ASIC), or be configured as one or more integrated circuits that implement the embodiments of the present application.

Figure 8:
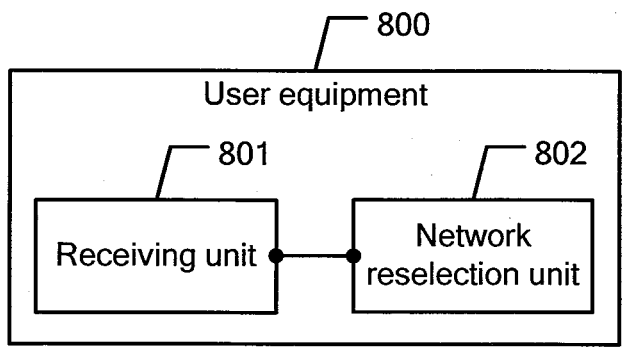
FIG. 8 is a schematic diagram of an embodiment of a use equipment according to the present application.

The following describes UE in an embodiment of the present application. Referring to FIG. 8, UE 800 in this embodiment includes:

a receiving unit 801, configured to receive a temporary priority list sent by a source access network device, where the temporary priority list includes a frequency of a source network, a frequency of a target network, a priority of the frequency of the source network, and a priority of the frequency of the target network, and the source access network device is a device that enables the UE to access the source network; and a network reselection unit 802, configured to perform network reselection according to the priorities of the frequencies in the temporary priority list that is received by the receiving unit 801.

The receiving unit 801 is further configured to: when the network reselection unit 802 reselects and accesses the target network, receive a temporary priority list that a target access network device receives from the source access network device and sends to the UE, where the target access network device is a device that enables the UE to access the target network.

In this embodiment, when UE is located in a source network, a receiving unit receives a temporary priority list sent by a source access network device, and a network reselection unit reselects a target network according to the temporary priority list; when the UE is located in the target network, the receiving unit receives the temporary priority list sent by a target access network device. In other words, in the inter-RAT network, regardless of which network the UE is located in, priority lists received are the same; therefore, ping-pong reselection may be effectively prevented.

It should be noted that the receiving unit in this embodiment may be a receiver of UE, or may be a transceiver of the UE. The network reselection unit may be an independently set processor or may be integrated into a processor of the UE for implementation. Besides, the network reselection unit may also be stored in a memory of the UE in a form of program code. A function of the network reselection unit is invoked and executed by a processor of the UE. The processor herein may be a central processing unit (CPU), or an application-specific integrated circuit (ASIC), or be configured as one or more integrated circuits that implement the embodiments of the present application.

Figure 9:
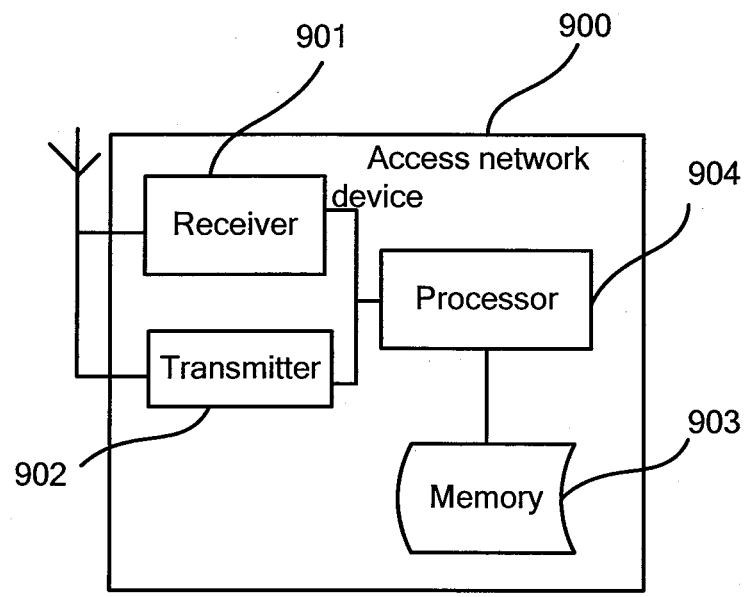
FIG. 9 is a schematic diagram of another embodiment of an access network device according to the present application.

The following further describes an access network device in an embodiment of the present application. Referring to FIG. 9, the access network device in this embodiment is a device that enables UE to access a source network, that is, a source access network device. An access network device 900 in this embodiment includes:

a receiver 901, a transmitter 902, a memory 903, and a processor 904, where the receiver 901, the transmitter 902, and the memory 903 are all connected to the processor 904, for example, through a bus. Certainly, a base station may include general components such as an antenna, a baseband processing component, an intermediate frequency and radio frequency processing component, and an input-output apparatus. This embodiment of the present application sets no limitation thereto.

The receiver 901 and the transmitter 902 may be integrated to form a transceiver.

The memory 903 is configured to store executable program code, where the program code includes a computer operation instruction. The memory 903 may include a high-speed RAM memory, or may include a non-volatile memory, for example, at least one disk memory.

The processor 904 may be a central processing unit (CPU), or an application-specific integrated circuit (ASIC), or be configured as one or more integrated circuits that implement the embodiments of the present application.

The processor 904 is configured to generate a temporary priority list, where the temporary priority list includes a frequency of the source network, a frequency of a target network, a priority of the frequency of the source network, and a priority of the frequency of the target network.

The transmitter 902 is configured to send the temporary priority list to a target access network device, where the target access network device is a device that enables the UE to access the target network, and send the temporary priority list to the UE.

In the foregoing temporary priority list, the priority of the frequency of the source network is lower than the priority of the frequency of the target network.

The processor 904 is further configured to: detect load of a serving cell, where the serving cell is a cell that is of the source network and on which the UE currently camps; when the load of the serving cell is greater than a first load threshold, detect load of the source network; when the load of the source network is greater than a second load threshold, send a load information acquisition request to another network of a different RAT, receive load information fed back by the another network of a different RAT, search for, according to the load information, a network that is of a different RAT and whose load is less than a third load threshold, use the network that is of a different RAT and whose load is less than the third load threshold as the target network, and generate the temporary priority list.

A method for detecting the load of the source network by the processor 904 specifically includes:

deducing the load of the source network according to the detected load of the serving cell; or acquiring load of cells with all frequencies in the source network from a master control node, and adding the load of the cells with all the frequencies in the source network together.

A method for sending the temporary priority list to the target access network device by the transmitter 902 specifically includes:

sending the temporary priority list to the target access network device by using a radio access network information management (RIM) procedure; or sending the temporary priority list to the master control node, so as to send the temporary priority list to the target access network device through the master control node.

After the transmitter 902 sends the temporary priority list to the UE, the processor 904 continues detecting the load of the source network. When the processor 904 detects that the load of the source network is less than the second load threshold, the transmitter 902 sends first information to the target access network device by using the RIM procedure, where the first information is used to instruct the target access network device, like the source access network device, to send an original priority list to the UE; or when the processor 904 detects that the load of the source network is less than the second load threshold, the transmitter 902 sends second information to the master control node, so as to send the second information to the target access network device through the master control node, where the second information is used to instruct the target access network device, like the source access network device, to send an original priority list to the UE.

Figure 10:
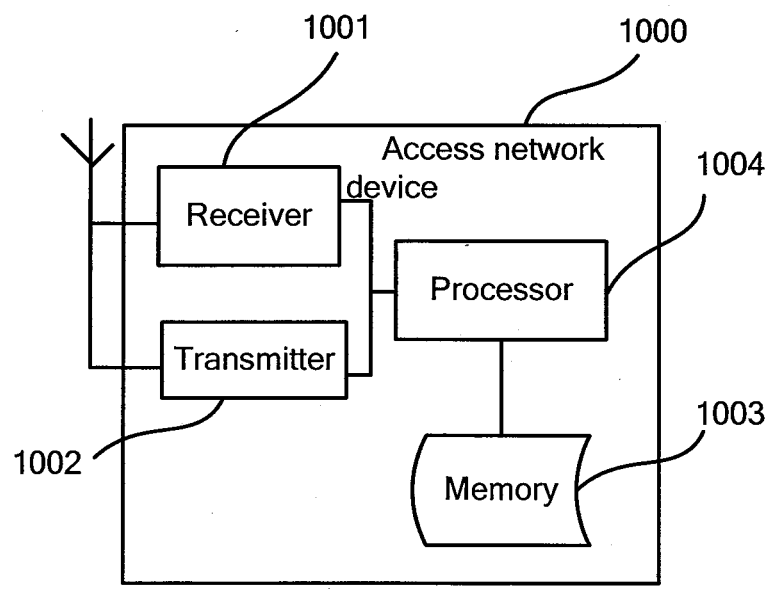
FIG. 10 is a schematic diagram of another embodiment of an access network device according to the present application.

The following further describes an access network device in an embodiment of the present application. Referring to FIG. 10, the access network device in this embodiment is a device that enables UE to access a target network, that is, a target access network device. An access network device 1000 in this embodiment includes:

a receiver 1001, a transmitter 1002, a memory 1003, and a processor 1004, where the receiver 1001, the transmitter 1002, and the memory 1003 are all connected to the processor 1004, for example, by using a bus. Certainly, a base station may include general components such as an antenna, a baseband processing component, an intermediate frequency and radio frequency processing component, and an input-output apparatus. This embodiment of the present application sets no limitation thereto.

The receiver 1001 and the transmitter 1002 may be integrated to form a transceiver.

The memory 1003 is configured to store executable program code, where the program code includes a computer operation instruction. The memory 1003 may include a high-speed RAM memory, or may include a non-volatile memory, for example, at least one disk memory.

The processor 1004 may be a central processing unit (CPU), or an application-specific integrated circuit (ASIC), or be configured as one or more integrated circuits that implement the embodiments of the present application.

The processor 1004 is configured to execute the executable program code stored in the memory 1003.

The receiver 1001 is configured to receive a temporary priority list sent by a source access network device, where the temporary priority list includes a frequency of a source network, a frequency of a target network, a priority of the frequency of the source network, and a priority of the frequency of the target network, and the source access network device is a device that enables the UE to access the source network.

The transmitter 1002 is configured to send the temporary priority list to the UE.

In the temporary priority list, the priority of the frequency of the source network is lower than the priority of the frequency of the target network.

Figure 11:
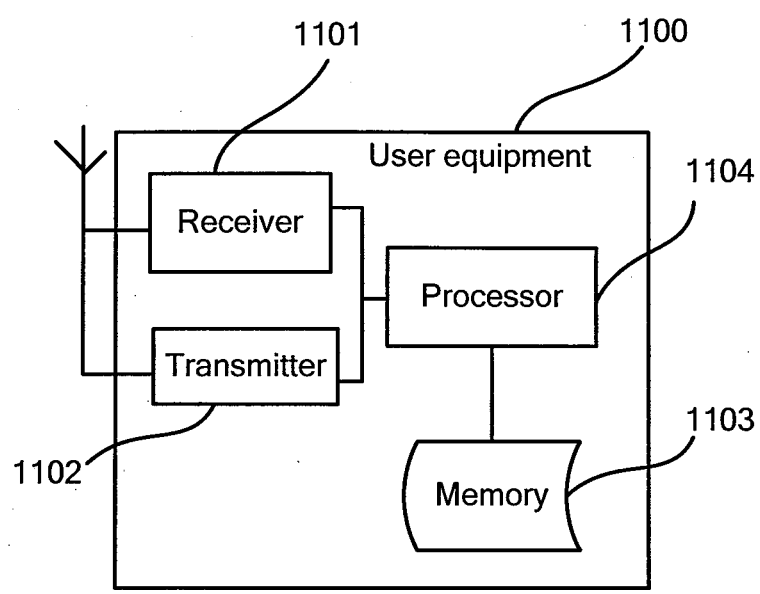
FIG. 11 is a schematic diagram of another embodiment of user equipment according to the present application.

The following further describes UE in an embodiment of the present application. Referring to FIG. 11, UE 1100 in this embodiment includes:

a receiver 1101, a transmitter 1102, a memory 1103, and a processor 1104, where the receiver 1101, the transmitter 1102, and the memory 1103 are all connected to the processor 1104, for example, by using a bus. Certainly, the UE may include general components such as an antenna, a baseband processing component, an intermediate frequency and radio frequency processing component, and an input-output apparatus. This embodiment of the present application sets no limitation thereto.

The receiver 1101 and the transmitter 1102 may be integrated to form a transceiver.

The memory 1103 is configured to store executable program code, where the program code includes a computer operation instruction. The memory 1103 may include a high-speed RAM memory, or may include a non-volatile memory, for example, at least one disk memory.

The processor 1104 may be a central processing unit (CPU), or an application-specific integrated circuit (ASIC), or be configured as one or more integrated circuits that implement the embodiments of the present application.

The receiver 1101 is configured to receive a temporary priority list sent by a source access network device, where the temporary priority list includes a frequency of a source network, a frequency of a target network, a priority of the frequency of the source network, and a priority of the frequency of the target network, and the source access network device is a device that enables the UE to access the source network.

The processor 1104 is configured to perform network reselection according to the priorities of the frequencies in the temporary priority list.

The receiver 1101 is further configured to: when the processor 1104 reselects and accesses the target network, receive a temporary priority list that a target access network device receives from the source access network device and sends to the UE, where the target access network device is a device that enables the UE to access the target network.

In the temporary priority list, the priority of the frequency of the source network is lower than the priority of the frequency of the target network.

In addition, it should be noted that the described apparatus embodiment is merely exemplary. The units described as separate parts may or may not be physically separate, and parts displayed as units may or may not be physical units, may be located in one position, or may be distributed on a plurality of network units. A part or all of the units may be selected according to actual needs to achieve the purposes of the solutions of the embodiments. In addition, in the accompanying drawings of the apparatus embodiments provided by the present application, connection relationships between units indicate that the units have communication connections with each other, which may be specifically implemented as one or more communications buses or signal cables. A person of ordinary skill in the art may understand and implement the embodiments of the present application without creative efforts.

Based on the foregoing descriptions of the embodiments, a person skilled in the art may clearly understand that the present application may be implemented by software in addition to necessary universal hardware or by dedicated hardware only, including a dedicated integrated circuit, a dedicated CPU, a dedicated memory, a dedicated component and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present application, software program implementation is a better implementation manner in most cases. Based on such an understanding, the technical solutions of the present application essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present application.

The foregoing describes in detail a method for coordinating broadcast messages in an inter-RAT network and the access network device that are provided by the embodiments of the present application. A person of ordinary skill in the art may, according to the idea of the present application, make modifications with respect to the specific implementation manners and the application scope. Therefore, the content of this specification shall not be construed as a limitation on the present application.

What is claimed is:

1. A communication method in an inter-radio network technology (inter-RAT) network comprising a source network of a first RAT and a target network of a second RAT, the method comprising:
   detecting, by a source access network device, a load of a serving cell, the serving cell being a cell of the source network and on which a user equipment (UE) currently camps, the source access network device being a device that enables the UE to access the source network;
   when the load of the serving cell is greater than a first load threshold, detecting, by the source access network device, a load of the source network;
   when the load of the source network is greater than a second load threshold, generating, by the source access network device, a temporary priority list comprising a frequency of the source network, a frequency of the target network, a priority of the frequency of the source network, and a priority of the frequency of the target network;
   sending, by the source access network device, the temporary priority list to a target access network device that enables the UE to access the target network; and
   sending, by the source access network device, the temporary priority list to the UE.

2. The method according to claim 1, wherein the priority of the frequency of the source network is lower than the priority of the frequency of the target network.

3. The method according to claim 1, wherein detecting the load of the source network, comprises:
   deducing, by the source access network device, the load of the source network according to the detected load of the serving cell; or
   acquiring, by the source access network device, load of cells with all frequencies in the source network from a master control node, and adding the load of the cells with all frequencies in the source network together.

4. The method according to claim 1, wherein after detecting that the load of the source network is greater than the second load threshold and before generating the temporary priority list, the method further comprises:
   sending, by the source access network device, a load information acquisition request to another network of a different RAT;
   receiving, by the source access network device, load information fed back by the other network of a different RAT; and
   searching for, according to the load information, a network that is of a different RAT and whose load is less than a third load threshold, and using the network that is of a different RAT and whose load is less than the third load threshold as the target network.

5. The method according to claim 1, wherein sending the temporary priority list to the target access network device comprises:

sending, by the source access network device, the temporary priority list to the target access network device by using a radio access network information management (RIM) procedure; or sending, by the source access network device, the temporary priority list to a master control node, so as to send the temporary priority list to the target access network device through the master control node.

6. The method according to claim 1, wherein after sending the temporary priority list to the UE, the method further comprises:

detecting, by the source access network device, load of the source network; and when the source access network device detects that the load of the source network is less than the second load threshold, sending, by the source access network device, information to the target access network device, wherein the information is used to instruct the target access network device, like the source access network device, to send an original priority list to the UE.

7. The method according to claim 6, wherein sending the information to the target access network device, comprises:

sending, by the source access network device, the information to the target access network device by using a RIM procedure; or sending, by the source access network device, the information to a master control node, so as to send the information to the target access network device through the master control node.

8. An access network device for enabling user equipment (UE) to access a source network, the access network device comprising:

a non-transitory computer readable storage medium configured to store a program; and a processor configured to execute the program to:

detect a load of a serving cell, the serving cell being a cell of the source network and on which the UE currently camps;

when the load of the serving cell is greater than a first load threshold, detect a load of the source network;

when the load of the source network is greater than a second load threshold, generate a temporary priority list comprising a frequency of the source network, a frequency of a target network, a priority of the frequency of the source network, and a priority of the frequency of the target network;

send the temporary priority list to a target access network device, wherein the target access network device is a device that enables the UE to access the target network; and send the temporary priority list to the UE.

9. The access network device according to claim 8, wherein the priority of the frequency of the source network is lower than the priority of the frequency of the target network.

10. The access network device according to claim 8, wherein the processor is further configured to execute the program to:

deduce the load of the source network according to the detected load of the serving cell; or acquire load of cells with all frequencies in the source network from a master control node, and add the load of the cells with all the frequencies in the source network together.

11. The access network device according to claim 8, wherein after it is detected that the load of the source network is greater than the second load threshold and before generating the temporary priority list, the processor is further configured to execute the program to:

send a load information acquisition request to another network of a different radio access technology (RAT);

receive load information fed back by the another network of a different RAT;

search for a network that is of a different RAT and whose load is less than a third load threshold according to the load information; and use the network that is of a different RAT and whose load is less than the third load threshold as the target network.

12. The access network device according to claim 8, wherein the processor is further configured to execute the program to:

send the temporary priority list to the target access network device by using a radio access network information management (RIM) procedure; or send the temporary priority list to a master control node, so as to send the temporary priority list to the target access network device through the master control node.

13. The access network device according to claim 8, wherein the processor is further configured to execute the program to:

detect load of the source network after sending the temporary priority list to the UE; and send, when it is detected that the load of the source network is less than the second load threshold, information to the target access network device, wherein the information is used to instruct the target access network device, like a source access network device, to send an original priority list to the UE.

14. The access network device according to claim 13, wherein the information is sent to the target access network device by using a radio access network information management (RIM) procedure or through a master control node.

15. An access network device for enabling user equipment (UE) to access a target network, the access network device comprises:

a non-transitory computer readable storage medium configured to store a program; and a processor configured to execute the program to:

receive a temporary priority list sent by a source access network device, wherein the temporary priority list comprises a frequency of a source network, a frequency of the target network, a priority of the frequency of the source network, and a priority of the frequency of the target network, and wherein the source access network device is a device that enables the UE to access the source network, and send the temporary priority list to the UE in the target network, wherein the temporary priority list is the same as a temporary priority list sent by the source access network device directly to the UE in a source network, wherein the temporary priority list sent by the source access network device was received by the UE before the UE performed a network reselection from the source network to the target network according to the priorities of the frequencies in the temporary priority list.

16. The access network device according to claim 15, wherein the priority of the frequency of the source network is lower than the priority of the frequency of the target network.

17. A user equipment (UE), comprising:

a non-transitory computer readable storage medium configured to store a program; and a processor configured to execute the program to:
- receive a temporary priority list sent by a source access network device, wherein the temporary priority list comprises a frequency of a source network, a frequency of a target network, a priority of the frequency of the source network, and a priority of the frequency of the target network, and the source access network device is a device that enables the UE to access the source network,
- perform network reselection according to the priorities of the frequencies in the temporary priority list, and
- receive, when the UE reselects the target network, the temporary priority list that a target access network device receives from the source access network device and sends to the UE, wherein the target access network device is a device that enables the UE to access the target network.

18. The UE according to claim 17, wherein the priority of the frequency of the source network is lower than the priority of the frequency of the target network.

* * * * *